US008514173B2

(12) United States Patent
Urbach, III (10) Patent No.: US 8,514,173 B2
(45) Date of Patent: *Aug. 20, 2013

(54) HAND INTEGRATED OPERATIONS PLATFORM

(71) Applicant: Walter Urbach, III, San Diego, CA (US)

(72) Inventor: Walter Urbach, III, San Diego, CA (US)

(73) Assignees: Norstar Asset Management, Inc., La Jolla, CA (US); Walter Urbach IV Trust, La Jolla, CA (US), Dated Dec. 21, 2012; Walter Urbach III Trust, La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,458

(22) Filed: Feb. 11, 2013

(65) Prior Publication Data

US 2013/0154927 A1     Jun. 20, 2013

Related U.S. Application Data

(63) Continuation of application No. 11/879,131, filed on Jul. 16, 2007, now Pat. No. 8,373,653.

(51) Int. Cl.
*G09G 5/00* (2006.01)

(52) U.S. Cl.
USPC ........... 345/156; 345/157; 345/158; 345/160; 345/161; 345/163; 345/167; 345/168; 345/173

(58) Field of Classification Search
USPC .................................................. 345/156–184
See application file for complete search history.

(56) References Cited

U.S. PATENT DOCUMENTS

| | | | |
|---|---|---|---|
| 4,954,817 A * | 9/1990 | Levine | 345/179 |
| D391,250 S | 2/1998 | Swift et al. | |
| 6,222,526 B1 | 4/2001 | Holmes | |
| 6,380,923 B1 * | 4/2002 | Fukumoto et al. | 345/156 |
| 6,698,952 B1 | 3/2004 | Goddard | |
| 6,870,526 B2 | 3/2005 | Zngf et al. | |
| 7,057,604 B2 | 6/2006 | Bajramovic | |
| 7,379,052 B1 | 5/2008 | Dellenger | |
| 2001/0035856 A1 | 11/2001 | Myers | |
| 2002/0118167 A1 | 8/2002 | Mei et al. | |
| 2002/0175894 A1 * | 11/2002 | Grillo | 345/156 |
| 2003/0076296 A1 | 4/2003 | Kolybaba | |
| 2003/0090465 A1 * | 5/2003 | Dellinger | 345/167 |
| 2004/0051694 A1 | 3/2004 | Backman et al. | |
| 2005/0206619 A1 | 9/2005 | McLoone et al. | |
| 2006/0129070 A1 | 6/2006 | Pearl et al. | |
| 2006/0152484 A1 | 7/2006 | Rolus Borgward | |
| 2006/0227101 A1 | 10/2006 | Kackman et al. | |
| 2007/0147025 A1 * | 6/2007 | Shirey | 362/103 |

* cited by examiner

*Primary Examiner* — Kevin M Nguyen
*Assistant Examiner* — Cory Almeida
(74) *Attorney, Agent, or Firm* — Duane Morris LLP (57) ABSTRACT

One embodiment of a hand integrated mouse or operations platform remotely operates one or more computer applications while worn on the user's hand and the hand is also free to do other things such as keyboarding, driving, and flying.

20 Claims, 7 Drawing Sheets

HAND INTEGRATED OPERATIONS PLATFORM

CROSS REFERENCE TO RELATED APPLICATIONS

This application is a continuation of U.S. patent application Ser. No. 11/879,131, originally entitled Hand Integrated Mouse Platform as filed on Jul. 16, 2007, issued as U.S. Pat. No. 8,373,653, the contents of which are incorporated by reference as if set forth in their entirety.

BACKGROUND OF THE INVENTION

1. Technical Field

This invention relates to a controller platform similar in utility to a desktop computer mouse platform, but is unique in that it is configured to be operated while worn on the hand, configured to accommodate multiple controllers, and interfaces with one or more programs and its own power source.

2. Discussion of Prior Art

The most popular controller platform is the computer mouse, either wired or wireless. The mouse platform functions primarily as a pointing device. They are available in a large variety of sizes and colors and may be operated on a flat surface or hand-held. A large diversity in mouse platforms is available and may be equipped with an assortment of control buttons or wheels. They house at least one motion sensing mechanism. The purpose of the control buttons, joy sticks, wheels, and motion sensing mechanisms is to interface with the computer's software programs.

Currently, the most popular desktop computer mouse platforms are shaped like half an ostrich egg cut lengthwise, with the flat side facing down. The user usually rests their hand on or over the wider end of the top side area, with the smaller end facing away from the user. Two control buttons—a right and left are at the top of the small side with a scroll wheel between the right and left control buttons. The flat side bottom houses one of several types of motion sensing mechanisms.

Current computer mouse platform designs require the operator to reach out to and withdraw from the mouse platform between operations. A few designs provide that the mouse platform can be held in the operator's hand. However, they must also be picked up and put down in order to free the hand for some other task.

Operating a traditionally designed desktop computer mouse typically requires a dedicated flat surface area—limiting the use of desk space. For the operation of many programs, the use of both keyboard and mouse are essential.

None of the current designs allow the operator to use their hand and fingers for other functions while holding or operating the mouse. The constant reaching and withdrawing from the mouse to the keyboard and frequent necessity to pick it up and put it down is inefficient and can cause repetitive strain injury to the shoulder, elbow, and carpal tunnel.

SUMMARY

The Hand Integrated Mouse Platform will provide a new and distinctly different controller platform option for users and manufacturers. The Hand Integrated Mouse Platform provides a means for accommodating a multitude of controls such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices. The Hand Integrated Mouse Platform also contains its own power source. The primary difference between the Hand Integrated Mouse Platform and other platforms is that the operator may utilize the Hand Integrated Mouse Platform while doing other things that require the substantial use of their hands and fingers (such as keyboarding, driving, flying). This arrangement provides minimal interference while relieving users from the need to pick up, put down, or reach for the mouse or other platforms between operations. Although the Hand Integrated Mouse Platform can be either a wired or wireless (battery or rechargeable) platform it is much more functional in its wireless configuration. The finished embodiment will be determined by its specific proposed use and the space requirements of each individual controller. The benefits include: saving time, reducing operating space requirements, and reducing the likelihood of developing repetitive strain injury in the shoulder, elbow, and carpal tunnel; as well as allowing the user more flexibility in body positioning. This utility also lends itself to evolutionary changes as the electronics world becomes increasingly miniaturized and more functional.

DRAWINGS

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing. In the drawings, closely related figures have the same number but different numeric or alphabetic suffixes.

FIG. 1.1 shows a perspective view of FIG. 1 embodiment integrated with the right hand as it could be used while driving.

FIG. 3.1 shows a perspective view of the FIG. 3 embodiment integrated with the right hand as it could be used while driving.

DRAWING

Reference Numerals

Figure 1:
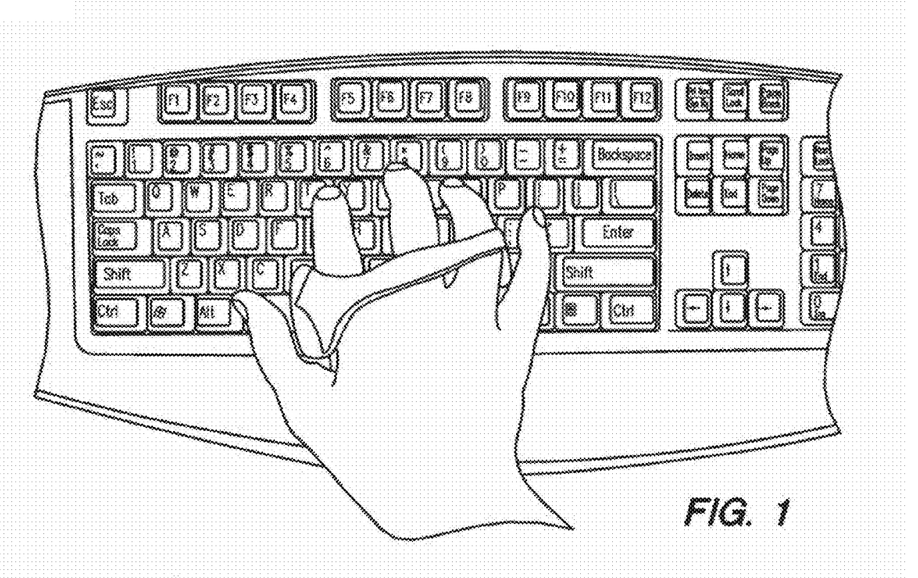
FIG. 1 shows a perspective view of one embodiment integrated with the right hand as it could be used while keyboarding.
Figure 2:
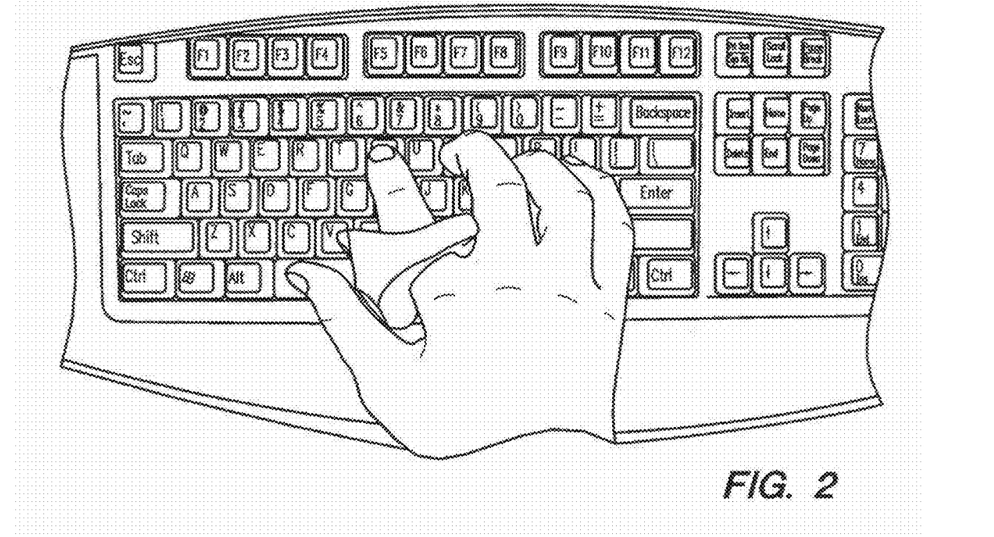
FIG. 2 shows a perspective view of the one embodiment, different from that in FIG. 1, integrated with the right hand as it could be used while keyboarding.
Figure 2A:
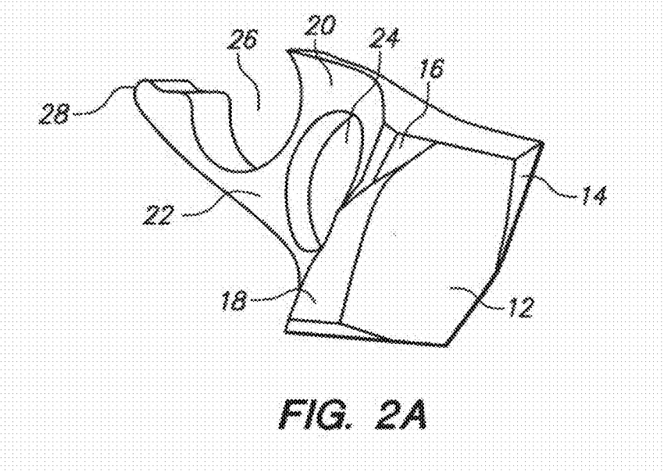
FIGS. 2A to 2C show various aspects of the FIG. 2 embodiment.
Figure 2B:
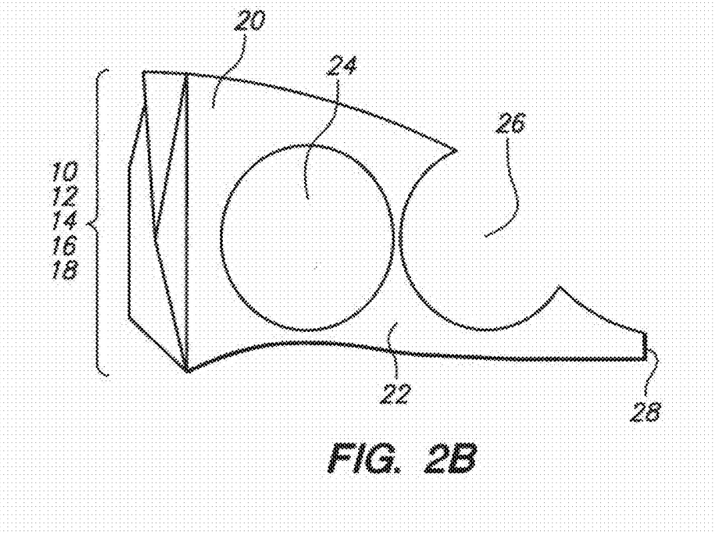
Figure 2C:
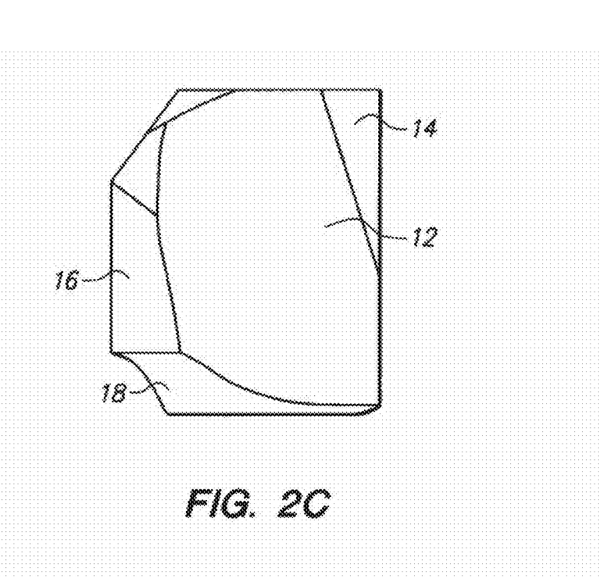
Figure 3:
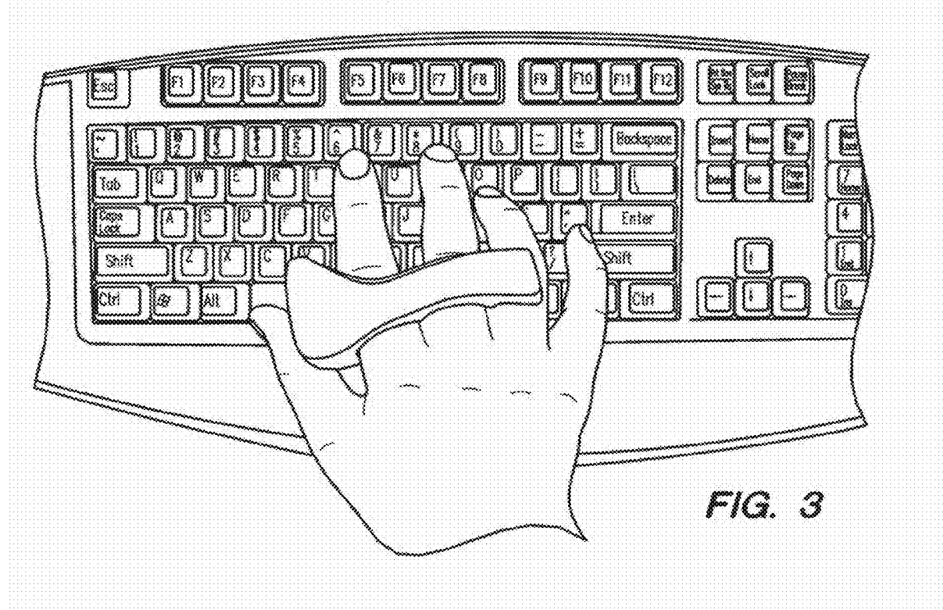
FIG. 3 shows a perspective view of one embodiment, different from that in FIGS. 1 & 2, integrated with the right hand as it could be used while keyboarding.
Figure 3A:
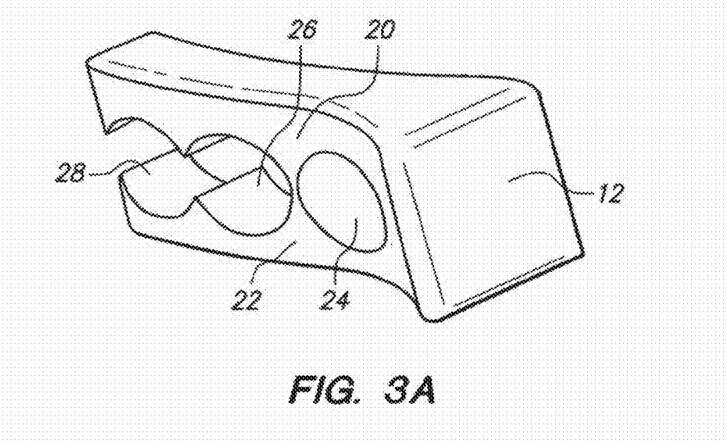
FIGS. 3A to 3C show various aspects of an embodiment different from that in FIGS. 1 and 2.
Figure 3B:
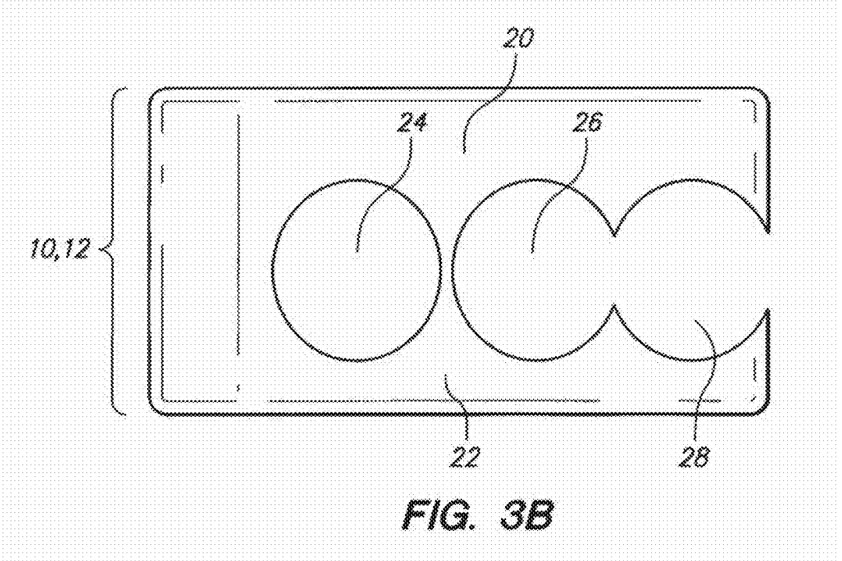
Figure 3C:
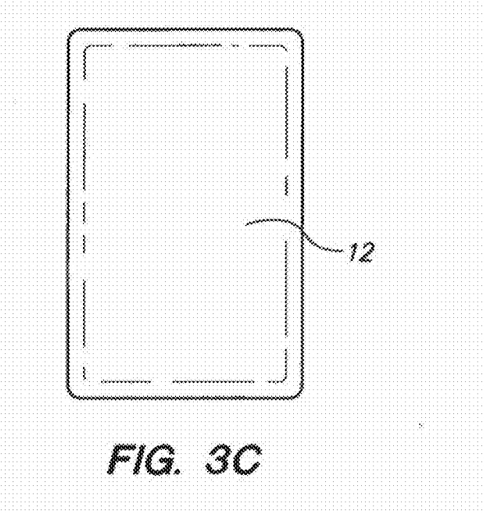
Figure 11:
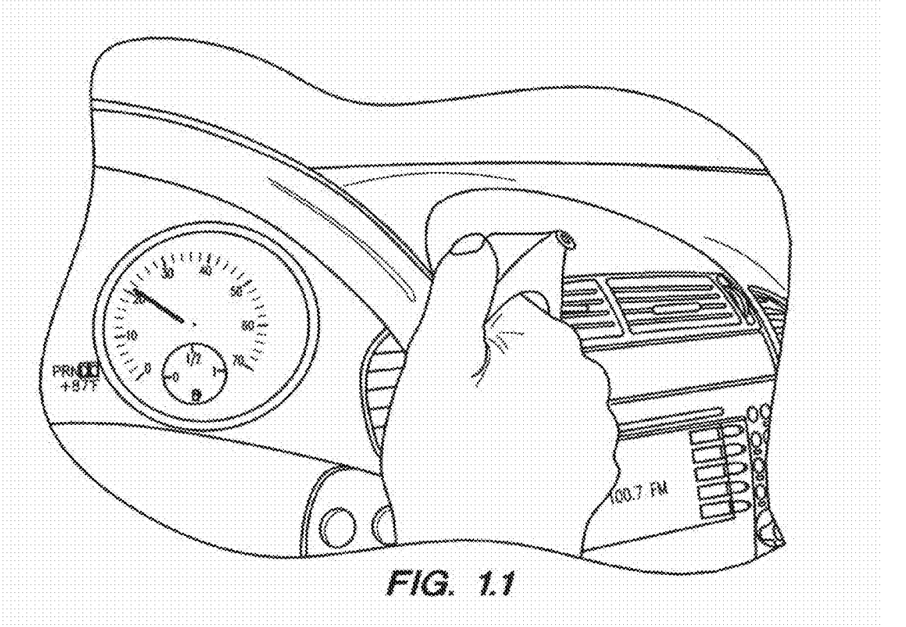
Figure 31:
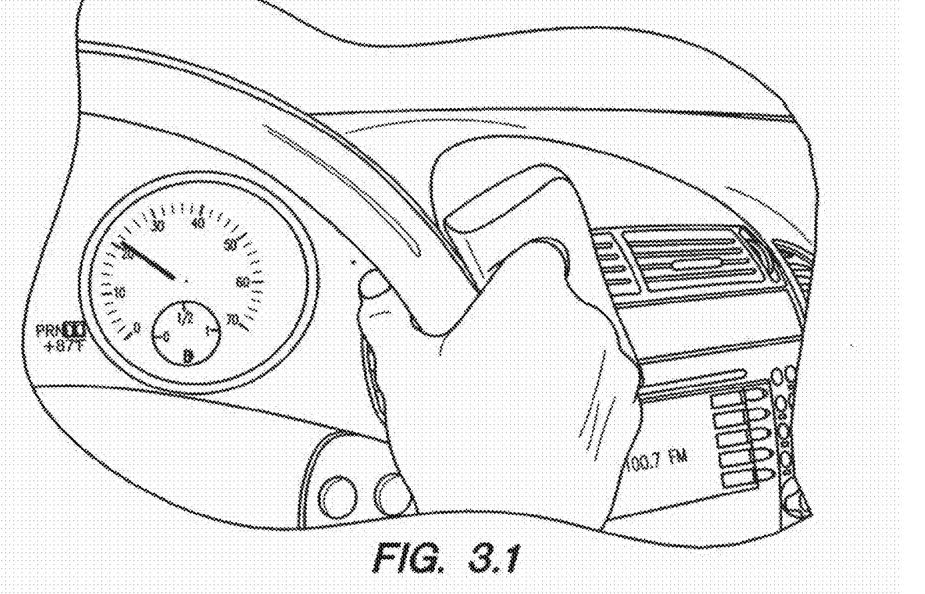

FIGS. 1, 2, and 3 show perspective views of different embodiments of the Hand Integrated Mouse Platform. Note: Not all embodiments contain all the components cited below, but they all contain the essential platform (in various configurations) for incorporating a variety of interactive devices, power source, and the finger elements necessary to provide operating stability.

10. Face (may have one or multiple stages)
12. Main Stage (may be contoured to meet specific controller needs)
14. Second Stage (may be contoured to meet specific controller needs)
16. Third Stage (may be contoured to meet specific controller needs)
18. Fourth Stage (may be contoured to meet specific controller needs)
20. Knuckle Arm
22. Palm Arm
24. Index Finger Support Ring
26. Middle Finger Support Arm (finger be open)
28. Little Finger Support End (tapered)

DETAILED DESCRIPTION

Figure 1A:
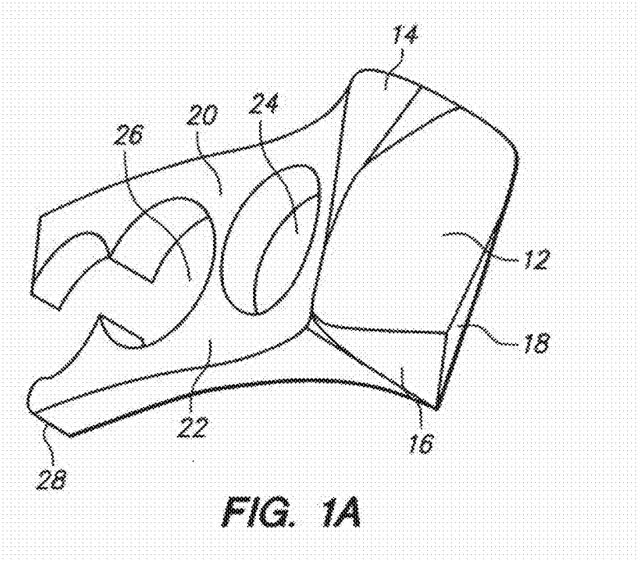
FIGS. 1A to 1C show various aspects of FIG. 1 embodiment.
Figure 1B:
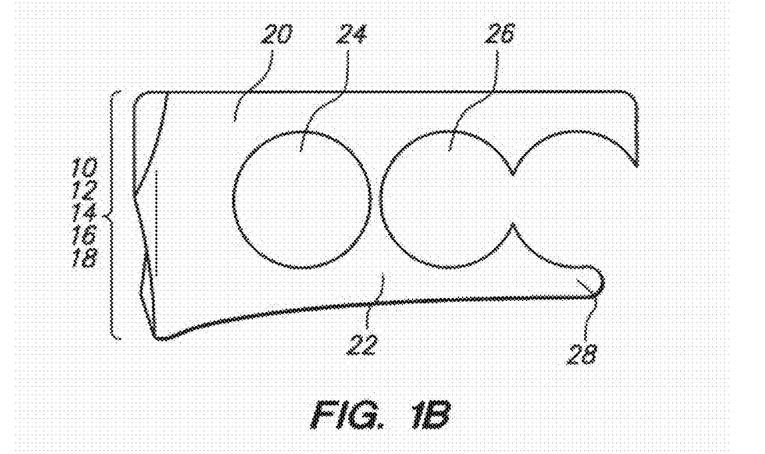
Figure 1C:
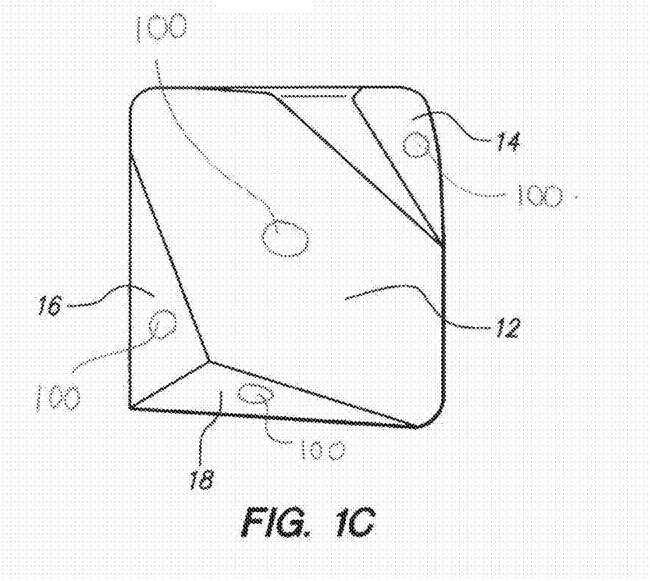

The Face (10) is configured to accommodate one or more stages. It is most clearly illustrated in FIGS. 1A and 1B that Face 10 faces the user's thumb and not the user's fingers, when worn on the user's hand. FIGS. 1A and 1B also clearly illustrate that Face 10 is generally orthogonal to the longitudinal direction of the hand integrated mouse platform. The longitudinal direction is the left-to-right direction as shown in the configuration illustrated in FIG. 1B, i.e. the direction along the knuckles. Each stage (12), (14), (16), (18) and the knuckle arm (20), and palm arm (22) serves as an installation site for the various controller interface devices such as: dials, wheels, joysticks, touch screen, camera, scanner, phone, speaker, microphone, switches, signal-strength bar, power bar, sensitivity control, security screener, and sensors that respond to motion and/or pressure, and that interface with one or multiple program applications and devices; and can also serve as installation sites for the power source or other components. The aforementioned controller interface devices are shown on each of stages (12), (14), (16) and (18) in FIG. 1C, Controller interface devices (100) shown on stages (12), (14), (16) and (18) of FIG. 1C, may be any of the aforementioned controller interface devices and are present on each of the plurality of stages (12), (14), (16) and (18) according to the illustrated embodiment. The support elements (24), (26), and (28) provide the essential stability required to operate the input devices while integrated with the hand. The actual size and configuration of the support elements (26) and (28) may change contingent upon the specific devices installed and their need for stability in the various planes of motion.

From the description above, a number of advantages of the hand integrated mouse platform become evident:

a) Provides a new and distinctly different controller platform option for users and manufacturers.

b) Provides a means for accommodating a multitude of controls such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices.

c) Provides a housing for the power source.

d) Provides the operator with the ability to utilize the mouse platform while doing other things that require the substantial use of their hands and fingers (such as keyboarding, driving, flying).

e) Provides minimal interference while relieving users from the need to pick up, put down, or reach for the mouse or other platforms between operations.

f) Can be either a wired or wireless (battery or rechargeable) platform as determined by its specific proposed use and the space requirements of each individual controller, with wireless being the most likely and efficient.

g) Other benefits include: saving time, reducing operating space requirements, and reducing the likelihood of developing repetitive strain injury in the shoulder, elbow, and carpal tunnel.

h) Allows the user more flexibility in body positioning.

i) Can be used to remotely operate other computer controlled devices.

j) Lends itself to evolutionary changes as the electronic world becomes increasingly miniaturized and more fictional.

Accordingly, the reader will see that the Hand Integrated Mouse Platform can be used for a wide variety of computer interface applications.

Provides a new and distinctly different controller platform option for users and manufacturers.

Provides a means for accommodating a multitude of controls in or on the hand integrated mouse/operations platform such as: dials, wheels, joysticks, touch screen, camera, scanner, phone, speaker, microphone, switches, signal-strength bar, power bar, sensitivity control, security screener, and sensors that respond to motion and/or pressure; and that interface with one or multiple program applications and devices.

Provides a housing for the power source.

Provides the operator with the ability utilize the mouse platform while doing other things that require the substantial use of their hands and fingers (such as keyboarding, driving, flying).

Provides minimal interference while relieving users from the need to pick up, put down, or reach for the mouse or other platforms between operations.

Can be either a wired or wireless (battery or rechargeable) platform as determined by its specific proposed use and the space requirements of each individual controller, with wireless being the most likely and efficient.

Other benefits include: saving time, reducing operating space requirements, and reducing the likelihood of developing repetitive strain injury in the shoulder, elbow, and carpal tunnel.

Allows the user more flexibility in body positioning

Can be used to remotely operate other computer controlled devices.

Lends itself to evolutionary changes as the electronics world becomes increasingly miniaturized and more functional.

In one embodiment, provided is a hand integrated mouse platform for incorporating single or multiple computer input devices, comprising a single unitary housing including at least one opening therethrough for receiving a corresponding proximal phalanx of an individual finger other than a thumb, of a user, and at least one operable input device disposed therein or thereon. The single unitary housing is illustrated most clearly in FIGS. 1A, 1B, 2A, 2B, 3A and 3B. The user's thumb is disposed outside the housing when the hand integrated mouse platform is disposed on the user's hand. The openings each receive a corresponding proximal phalanx of an individual finger other than a thumb, of a user. FIG. 1A illustrates the inner surfaces of the openings that receive a corresponding individual finger other than a thumb, of a user and these inner surfaces are proximal phalanx facing surfaces. The figures, such as FIG. 1, FIG. 1.1, FIG. 2, FIG. 3 and FIG. 3.1 each illustrate the feature that no portion the hand integrated mouse platform is worn on the user's thumb and each of the illustrated embodiments illustrates the feature that the hand integrated mouse platform is sized to be worn between the metacarpals and the interphalangeal articulation of the user's hand closest to the user's palm, i.e. each opening receives only the proximal phalanx of an individual finger.

The illustrated embodiments also illustrates the feature that the depth of the openings that receive the proximal phalanges is less than the length of the proximal or intermediate phalanges of the user.

The hand integrated mouse platform can be worn on either the proximal phalanges or the intermediate phalanges and it can easily move back and forth between the two positions to accommodate the user performing other tasks with his fingers while wearing the hand integrated mouse platform. When the hand integrated mouse platform is worn on the proximal phalanges and between the metacarpals and the knuckle closest to the palm, the intermediate phalanges and distal phalanges of the fingers are disposed outside the housing and are therefore free to move. The resulting freedom enables dexterity that allows the user to do other things such as operate a keyboard, drive a vehicle, write with a pen or pencil, or operate various other devices, some examples of which are shown in the figures. The illustrations show that the openings that extend through the housing have a depth, i.e. the housing thickness at the openings, less than the length of the user's proximal phalanx such that the housing is sized to be wearable on the proximal phalanx. However, the hand integrated mouse platform can be worn on other body parts such as the intermediate phalanges in other embodiments in which the distal phalanges of the fingers are disposed outside the housing and are therefore free to move. Stated alternatively, the housing is sized to be worn between the metacarpophalangeal joints and the interphalangeal articulations of said user's hand closest to the user's palm in one embodiment, but can be worn on the intermediate phalanges in other embodiments.

Although the description above contains many specifications, there should not be construed as limiting the scope of the embodiment but as merely providing illustrations of some of the presently preferred embodiments. The Hand Integrated Mouse Platform is indeed a unique and highly useful utility with numerous potential controller applications within the computer and electronic device universe. The ramifications of my invention are that it could revolutionize the entire world of computer and electronic control platforms.

The material of this hand integrated mouse platform will be made of plastic in one embodiment, but other materials and combinations of materials are also suitable. The depicted and described embodiment is for a right handed male with a small hand. Other embodiments would accommodate different hand sizes (adult and children) and orientations (left and right). Various platform configurations to accommodate one or a multitude of primarily thumb-operated input devices such as: dials, wheels, joysticks, touch screen, camera, scanner, phone, speaker, microphone, switches, signal-strength bar, power bar, sensitivity control, security screener, and sensors that respond to motion and/or pressure, and that interface with one or multiple program applications and devices are intended. The preferred finished embodiment will operate remotely and be tailored to the individual. The beauty of this utility is that it can be easily adapted to meet a wide variety of requirements and can also be easily customized to accommodate individual preferences and/or physical limitations. It lends itself to evolutionary changes as the electronics world becomes increasingly miniaturized and more functional.

The preceding merely illustrates the principles of the disclosure. It will thus be appreciated that those of ordinary skill in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of exemplary embodiments, it is not limited thereto. Rather, the appended claims should be construed broadly, to include other variants and embodiments of the invention, which may be made by those of ordinary skill in the art without departing from the scope and range of equivalents of the invention.

What is claimed is:

1. A hand integrated mouse platform for incorporating single or multiple computer input devices, comprising:
a single unitary housing wearable on at least one of a user's fingers and including at least one opening therethrough, each said opening configured to at least partially surround a proximal or intermediate phalanx of at least one finger other than a thumb, of said user when said hand integrated mouse platform is worn on said user's hand, and a plurality of operable input devices disposed therein or thereon, said user's thumb disposed outside said housing and said single unitary housing including an outwardly facing end face facing said user's thumb when said hand integrated mouse platform is worn on said user's hand, said outwardly facing end face including at least one said operable input device disposed therein or thereon and operable by said user's thumb when said hand integrated mouse platform is worn on said user's hand,
wherein no portion said hand integrated mouse platform is worn on said user's thumb and inner surfaces of said openings comprise proximal or intermediate phalanx facing surfaces when said hand integrated mouse platform is worn on said user's hand.

2. The hand integrated mouse platform of claim 1 wherein said outwardly facing end face includes a plurality of contours, and a plurality of stages defined by said contours, each said stage including one said operable input device disposed therein or thereon and operable by said user's thumb when said hand integrated mouse platform is worn on said user's hand.

3. The hand integrated mouse platform of claim 1 wherein said platform is constructed of easily formed and molded material(s) such as plastic or composites and said housing is wearable on said at least one proximal phalanx of said user wherein said user's intermediate and distal phalanges are disposed outside said housing and said housing is further wearable on said at least one intermediate phalanx of said user, wherein said user's distal phalanges are disposed outside said housing.

4. The hand integrated mouse platform of claim 1 wherein said operable input device comprises at least one of: a dial, a wheel, a joystick touch screen, camera, scanner, phone, speaker, microphone, switches, signal-strength bar, power bar, sensitivity control, security screener, and sensors, said operable input device interfacing with one or multiple program applications and devices via a wire.

5. The hand integrated mouse platform of claim 1 wherein said platform includes its own power source.

6. The hand integrated mouse platform of claim 5, wherein said power source is a rechargeable power source.

7. The hand integrated mouse platform of claim 6, wherein said power source is a battery.

8. The hand integrated mouse platform of claim 1, wherein said plurality of operable input device comprises a speaker and a microphone.

9. The hand integrated mouse platform of claim 1, wherein said at least one opening therethrough comprises one opening that completely surrounds a plurality of fingers of said at least one finger other than a thumb, of said user, and said associated inner surface of said one opening has at least one ridge disposed at location between fingers of said plurality of fingers when said hand integrated mouse platform is worn on said user's hand.

10. The hand integrated mouse platform of claim 9, wherein said one opening completely surrounds two of said fingers other than a thumb, of said user.

11. The hand integrated mouse platform of claim 9, wherein said one opening is circumferentially surrounded by said housing and further comprising a second opening that said housing only partially encircles.

12. The hand integrated mouse platform of claim 9, wherein said one opening completely surrounds at least three of said fingers other than a thumb, of said user.

13. The hand integrated mouse platform of claim 1, wherein said at least one opening comprises a first opening that is circumferentially surrounded by said housing and a second opening that said housing only partially encircles.

14. A hand integrated operations platform for accommodating multiple controls that interface with one or multiple program applications or devices, said hand integrated operations platform comprising:
a single unitary housing wearable on at least one of a user's fingers and including an opening therethrough that surrounds a proximal phalanx of at least one finger other than a thumb, of said user when said hand integrated mouse platform is worn on said user's hand, an end face having contoured, non-planar surfaces defining a plurality of stages, and at least one operable input device disposed on each of said plurality of stages and operable by said user's thumb when said hand integrated mouse platform is worn on said user's proximal phalanges, said user's thumb disposed outside said housing and said user's intermediate and distal phalanges disposed outside said housing when said hand integrated mouse platform is worn on said user's hand, wherein no portion said hand integrated mouse platform is worn on said user's thumb and said end face is disposed generally orthogonal to a longitudinal direction of said single unitary housing.

15. The hand integrated operations platform of claim 14, wherein said one opening is a first opening adapted to circumferentially surround said proximal phalanx of an index finger of said user's hand and further comprising a second opening adapted to receive and only partially encircle an adjacent middle finger of said user's hand, each of said first and second openings including proximal phalanx facing inner surfaces.

16. The hand integrated operations platform of claim 15, wherein said housing includes a concave portion to receive thereon a ring finger of said user's hand and said second opening is at least partially defined by a ridge disposed between said adjacent middle finger and said ring finger of said user's hand.

17. A hand integrated operations platform for accommodating one or multiple input devices that interface with one or multiple program applications or devices, said hand integrated operations platform comprising:
a single unitary housing including at least one opening therethrough adapted to at least partially surround a proximal phalanx or an intermediate phalanx of at least one finger other than a thumb, of a user when said hand integrated mouse platform is worn on said user's hand, said user's thumb disposed outside said housing when said hand integrated mouse platform is disposed on said user's hand, wherein no portion said hand integrated mouse platform is worn on said user's thumb or on distal phalanges of said user's fingers, wherein said single unitary housing includes an outwardly facing end face facing said user's thumb when said hand integrated mouse platform is worn on said user's hand, said outwardly facing end face disposed generally orthogonal to a longitudinal direction of said single unitary housing and including a plurality of contours and a plurality of stages defined by said contours and at least one an operable input device disposed therein or thereon,
said at least one operable input device comprising a microphone and a speaker; and
a rechargeable power source disposed within said housing.

18. The hand integrated operations platform of claim 17, wherein each of said plurality of stages includes one said operable input device disposed therein or thereon and operable by said user's thumb when said hand integrated mouse platform is worn on said user's hand.

19. The hand integrated operations platform of claim 17, wherein said at least one opening comprises a first opening that is adapted to surround a plurality of said fingers other than said user's thumb.

20. The hand integrated operations platform of claim 19, wherein said first opening is circumferentially surrounded by said housing and has at least one inwardly extending ridge disposed at location between fingers of said plurality of fingers when said hand integrated mouse platform is worn on said user's hand, and wherein said at least one opening further comprises a second opening that said housing only partially encircles.

* * * * *